(12) United States Patent       (10) Patent No.:     US 9,172,819 B2
Morifuku                         (45) Date of Patent:     Oct. 27, 2015

(54) FILE TRANSFERS BASED ON TELEPHONE NUMBERS

(75) Inventor: Shigeru Morifuku, Chigasaki (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 123 days.

(21) Appl. No.: 13/810,348

(22) PCT Filed: Jul. 30, 2010

(86) PCT No.: PCT/US2010/044034
§ 371 (c)(1),
(2), (4) Date: Jan. 15, 2013

(87) PCT Pub. No.: WO2012/015442
PCT Pub. Date: Feb. 2, 2012

(65) Prior Publication Data
US 2013/0115929 A1    May 9, 2013

(51) Int. Cl.
*H04M 11/06* (2006.01)
*G06Q 10/10* (2012.01)
*H04L 29/12* (2006.01)
*H04M 3/533* (2006.01)
*H04L 29/08* (2006.01)

(52) U.S. Cl.
CPC ........... *H04M 11/066* (2013.01); *G06Q 10/107* (2013.01); *H04L 61/106* (2013.01); *H04L 61/605* (2013.01); *H04L 67/06* (2013.01); *H04M 3/533* (2013.01); *H04Q 2213/13389* (2013.01)

(58) Field of Classification Search
CPC ................... H04L 65/4023; H04M 2203/654; H04M 3/533; H04M 1/7255; H04M 3/5307; H04M 1/64; H04M 1/663; H04M 1/72547; H04M 1/72552; H04M 2203/4518; H04M 2250/60; H04W 4/12
USPC ........................................... 455/414.1, 412.1
See application file for complete search history.

(56) References Cited

U.S. PATENT DOCUMENTS 6,754,693 B1    6/2004   Roberts et al.
7,009,990 B1    3/2006   Adams et al.
(Continued)

FOREIGN PATENT DOCUMENTS

EP    1347604 A1    9/2003

OTHER PUBLICATIONS

International Search Report and Written Opinion received in PCT Application No. PCT/US2010/044034, mailed Apr. 28, 2011, pp. 9.

*Primary Examiner* — Nam Huynh
(74) *Attorney, Agent, or Firm* — Hewlett-Packard Patent Department

(57) ABSTRACT

Example embodiments disclosed herein relate to file transfers based on telephone numbers. In example embodiments, a request to transfer a file from a first user (305) associated with a first telephone number (309) to a second user associated (310) with a second telephone number (314) is received. In example embodiments, the second telephone number (314) is determined based on access to call records. In example embodiments, the file is then stored in or transferred to a location identified using the second telephone number (314).

15 Claims, 4 Drawing Sheets

(56) References Cited

U.S. PATENT DOCUMENTS

| | | |
|---|---|---|
| 7,065,189 B2 | 6/2006 | Wakabayashi |
| 7,257,400 B2 | 8/2007 | Urien |
| 8,225,383 B1 * | 7/2012 | Channakeshava et al. ....... 726/7 |
| 2002/0072921 A1 | 6/2002 | Boland et al. |
| 2004/0092250 A1 | 5/2004 | Valloppillil |
| 2006/0025113 A1 * | 2/2006 | Nguyen et al. ............ 455/412.1 |
| 2006/0075037 A1 | 4/2006 | Rothschild |
| 2008/0260118 A1 * | 10/2008 | Lyle ...................... H04M 1/663 379/88.23 |
| 2008/0275701 A1 | 11/2008 | Wu et al. |
| 2010/0054148 A1 * | 3/2010 | Murakami et al. ............ 370/252 |
| 2010/0278319 A1 * | 11/2010 | Wang et al. ........... H04L 12/589 379/88.11 |
| 2011/0098022 A1 * | 4/2011 | Shaw et al. .................. 455/413 |

* cited by examiner

FILE TRANSFERS BASED ON TELEPHONE NUMBERS

BACKGROUND

Prior to the global presence of the World Wide Web, people located apart from one another typically exchanged information via telephone conversations, faxes, and postal mail. With the rapid development of computer networks in the past several decades, users can now instantaneously transmit data to any location in the world. The ease with which data can be transmitted has encouraged widespread acceptance of email and other electronic methods for both business and personal communication.

As one example of the use of computer networks, a user may instantly transfer an electronic file, such as a word processing document, image, or video, to a location associated with a recipient, such as an email address, user name, or a location on a server. By downloading and opening the file on his or her computing device, the recipient can immediately access the transferred information. In current networks, in order to transfer an electronic file to another user, a computer user must typically know the other user's email address or another location identifier. Transferring files can therefore be burdensome when, for example, the recipient does not wish to disclose his or her identifier or when the transferring user simply does not know the recipient's identifier.

BRIEF DESCRIPTION OF THE DRAWINGS

The following detailed description references the drawings, wherein.

DETAILED DESCRIPTION

As described above, in order to transfer an electronic file to another user, a computer user must generally know the other user's email address or a similar identifier. This can be problematic if the recipient does not want to disclose his or her email address, if the sender does not know the email address, or if the sender makes an error in typing the email address. Furthermore, file transfers to email addresses may introduce security problems, as any user, even a malicious one, may send a file to a known email address.

To address these issues, example embodiments disclosed herein allow a sender to transfer a file to a recipient based on the establishment of a telephone connection with the recipient or the recipient's voicemail service. In particular, in some embodiments, a computing device receives a request to transfer a file from a first user associated with a first telephone number to a second user associated with a second telephone number. The computing device may then identify the second telephone number associated with the second user using a record of telephone calls including the first telephone number. Finally, the computing device may store the file in a location identified using the second telephone number for subsequent retrieval by the second user.

In this manner, a user may transfer a file to a recipient with knowledge of only the telephone number of the recipient. In particular, because the computing device may identify a storage location for the file based on the telephone numbers contacted by the first user, the user may easily transfer a file to a person with whom he or she has been in contact via telephone. Furthermore, by relying on the establishment of current or previous telephone connections in the telecommunication network, security of file transfers is increased by reducing the possibility of file transfers by malicious senders. Additional embodiments and applications of such embodiments will be apparent to those of skill in the art upon reading and understanding the following description.

Figure 1:
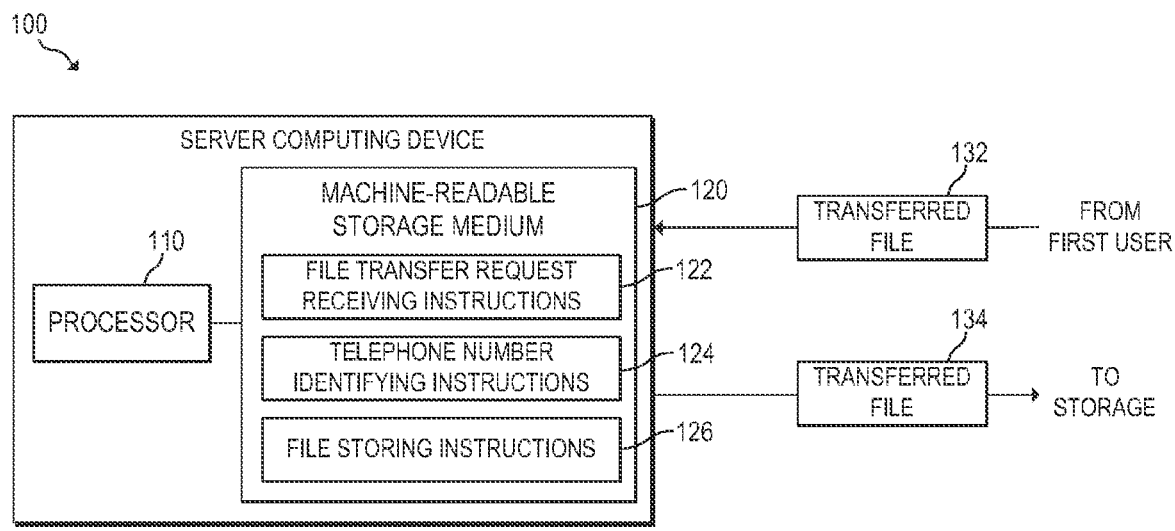
FIG. 1 is a block diagram of an example server computing device for receiving and processing a request to store a file in a location identified using a telephone number.

Referring now to the drawings, FIG. 1 is a block diagram of an example server computing device 100 for receiving and processing a request to store a received file 132 in a location identified using a telephone number. Server computing device 100 may be, for example, a web server, a Local Area Network (LAN) server, a file server, or any other computing device suitable for receiving and processing file storage requests. In the embodiment of FIG. 1, server computing device 100 includes a processor 110 and a machine-readable storage medium 120.

Processor 110 may be one or more central processing units (CPUs), semiconductor-based microprocessors, and/or other hardware devices suitable for retrieval and execution of instructions stored on machine-readable storage medium 120. In particular, processor 110 may fetch, decode, and execute instructions 122, 124, 126 to implement the functionality described in detail below. As an alternative or in addition to fetching, decoding, and executing instructions, processor 110 may include one or more integrated circuits (ICs) or other electronic circuits that comprise a plurality of electronic components for performing the functionality of one or more of instructions 122, 124, 126 described below.

Machine-readable storage medium 120 may be any electronic, magnetic, optical, or other physical storage device that contains or stores executable instructions. Thus, machine-readable storage medium may be, for example, Random Access Memory (RAM), a flash memory device, a hard disk, a Compact Disc Read Only Memory (CD-ROM), and the like. As described in detail below, machine-readable storage medium 120 may include instructions for receiving and processing a request to store a transferred file 132 in a location identified using a telephone number of a particular user.

Machine-readable storage medium 120 may include file transfer request receiving instructions 122, which may receive a request to transfer a file 132 from a first user associated with a first telephone number to a destination user associated with a second telephone number. Each telephone number may be assigned to a wireless telephone, a land-line telephone, a Voice Over Internet Protocol (VoIP) telephone, or any other telephone. Receiving instructions 122 may receive the file transfer request from the first user during a telephone call with the second telephone number, which may be either an established call or a voicemail service connection. Alternatively, receiving instructions 122 may receive the file transfer request subsequent to completion of such a call.

The file transfer request received by instructions 122 may originate from a web terminal of the first user, which may be, for example, a desktop or all-in-one computer, a notebook computer, a mobile phone, a slate computer, or any other computing device. An example embodiment of such a computing device is described in detail below in connection with client computing device 200 of FIG. 2. The web terminal may provide the request to server computing device 100 via a website or web-based application, an application running in an operating system of the web terminal, a mobile phone application, and the like. In submitting this request, the web terminal may include or identify a file to be transferred 132, which may be any electronic file, including, but not limited to, a word processing document, a Portable Document Format (PDF) file, an audio file, a video file, a folder, and an archive file, such as a .zip file.

Based on receipt of a request for a transfer of a file 132 from a requesting user to a destination user, telephone number identifying instructions 124 may identify a telephone number of the user to whom the file is to be transferred. In order to identify the destination telephone number, identifying instructions 124 may first identify the telephone number of the requesting user based, for example, on a query to a set of records that stores one or more activated telephone numbers for each user. For example, when the user has logged into a web-based application or other website, identifying instructions 124 may determine a user name, email address, or other identifier and use this identifier to query the set of records. Alternatively, identifying instructions 124 may use an embedded identifier of the web terminal (e.g., a unique device identifier) in querying the telephone number records. In some embodiments, a particular user may have multiple telephone numbers stored in association with his or her user identifier. In such embodiments, identifying instructions 124 may request that the user select one of his or her telephone numbers to be used as a source for the file transfer.

After identifying the requesting user's telephone number, identifying instructions 124 may use the identified telephone number to determine the telephone number associated with the destination user. As one example, identifying instructions 124 may determine the destination user's telephone number by querying a record of telephone calls using the telephone number of the requesting user. This record of telephone calls may be stored locally on server computing device 100 or, alternatively, be located in another server, such as a call control server that manages the establishment of calls in a telecommunication network. By querying the record of telephone calls using the identified telephone number of the requesting user, identifying instructions 124 may automatically identify a telephone number associated with the destination user.

It should be noted that the query used in retrieving the telephone number of the destination user may vary depending on the particular implementation. For example, when receiving instructions 122 received the request for a file transfer during a current call between the requesting user and the destination user, a query of the record of telephone calls may return the telephone number with which the requesting user's telephone number is currently connected. As another example, when receiving instructions 122 received the request subsequent to conclusion of a call, a query of the record of telephone calls may return the telephone number most recently connected with the requesting user's telephone number. As yet another example, identifying instructions 124 may retrieve a list of recent calls including the requesting user's telephone number and allow the user to select a destination telephone number. The list of recent calls may include, for example, a predetermined number of the most recent calls placed from and/or received by the user's telephone number.

Upon determining the telephone number of the destination user, file storing instructions 126 may store the file 134 in a storage location accessible by the destination user. The storage location may be, for example, a local storage area, which may include one or more hard disks, solid state drives, tape drives, nanodrives, holographic storage devices, or any combination of such storage devices. Alternatively, the storage location may be in a remote location, such as on a remote file server.

Regardless of whether the storage is local or remote, file storing instructions 126 may use the destination user's telephone number to identify the storage location. For example, file storing instructions 126 may store the file 134 in a location indexed using the telephone number of the destination user. As another example, file storing instructions 126 may index the storage area based on a user identifier (e.g., a user name) and use the telephone number to determine the user identifier. In this manner, each file stored in the storage location may be retrieved by the destination user using his or her telephone number and/or a user identifier and password.

Figure 2:
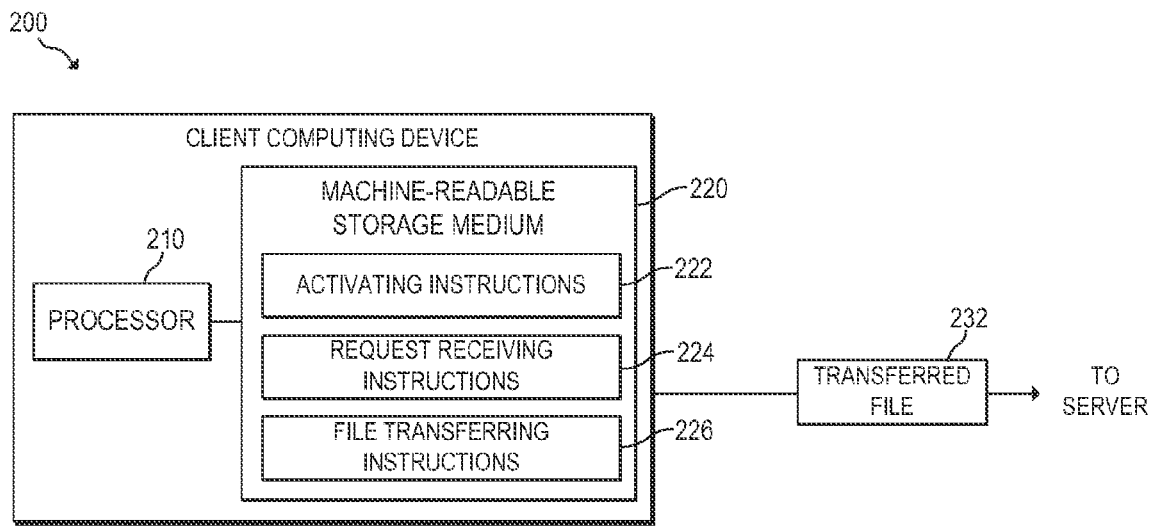
FIG. 2 is a block diagram of an example client computing device for transmitting a request to store a file in a location identified using a telephone number.

FIG. 2 is a block diagram of an example client computing device 200 for transmitting a request to store a file in a location identified using a telephone number. Client computing device 200 may be, for example, a desktop or all-in-one computer, a laptop computer, a mobile phone, a portable reading device, a slate computer, or any other computing device suitable for transferring files to a server computing device 100. In the embodiment of FIG. 2, client computing device 200 includes a processor 210 and a machine-readable storage medium 220.

Processor 210 may be one or more central processing units (CPUs), semiconductor-based microprocessors, and/or other hardware devices suitable for retrieval and execution of instructions stored on machine-readable storage medium 220. In particular, processor 210 may fetch, decode, and execute instructions 222, 224, 226 to implement the functionality described in detail below. As an alternative or in addition to fetching, decoding, and executing instructions, processor 210 may include one or more integrated circuits (ICs) or other electronic circuits that comprise a plurality of electronic components for performing the functionality of one or more of instructions 222, 224, 226 described below.

Machine-readable storage medium 220 may be any electronic, magnetic, optical, or other physical storage device that contains or stores executable instructions (e.g., RAM, flash memory, a hard disk, etc.). As described in detail below, machine-readable storage medium 220 may include instructions for transferring a file 232 to a server computing device 100 for storage in a location identified using a recipient's telephone number.

Machine-readable storage medium 220 may include activating instructions 222, which may enable activation of a user account of a first user to confirm a relationship between the user and a particular telephone number. In some embodiments, activating instructions 222 may simply output details regarding an activation process for manual execution by the user. For example, after proper authentication of the user (e.g., by logging in with a user name and password), activating instructions 222 may output the telephone number of an activation server and a random activation code received from an application server, such as server computing device 100 of FIG. 1. The user may then call the activation server using the telephone to be activated and provide the displayed activation code to the server (e.g., by entering the code or providing the code via Interactive Voice Response (IVR)). In response, the activation server may forward the entered code and the user's telephone number to the application server for verification.

In other embodiments, activating instructions 222 may manage the activation process. For example, activating instructions 222 may instruct the user that an activation code will be provided to the first telephone number via text message or an automated call. Activating instructions 222 may then request entry of the received code by the user and, upon entry of the code, forward the entered code to the application server for verification.

Regardless of the particular implementation of activation instructions 222, after their execution, a relationship between the user account and the user's telephone number may be confirmed. Accordingly, request receiving instructions 224 may then receive a request to transfer one or more files upon proper authentication of the user to a server that manages the file transfer process, such as server computing device 100 of FIG. 1. In order to properly authenticate, the user may, for example, provide a user name and password to the server. Upon proper authentication, request receiving instructions 224 may receive a request to transfer a file 232 from the first user to a destination user associated with a second telephone number.

Receiving instructions 224 may receive the file transfer request from the user during a telephone call with the second telephone number (either a connected call or a connection with a voicemail service) or, alternatively, subsequent to completion of such a call. Furthermore, request receiving instructions 224 may receive the request during display of a website or execution of a web-based application, mobile phone application, or any other application. For example, request receiving instructions 224 may detect a selection of an interface element and an identification of one or more files to be transferred.

Based on receipt of a file transfer request, file transferring instructions 226 may transfer the file 232 to the appropriate server for storage in a location identified using the telephone number of the destination user. As detailed above in connection with telephone number identifying instructions 124 of FIG. 1, in some embodiments, the server computing device 100 may automatically determine the second telephone number based on a query of call records of the transferring user's telephone number.

Figure 3:
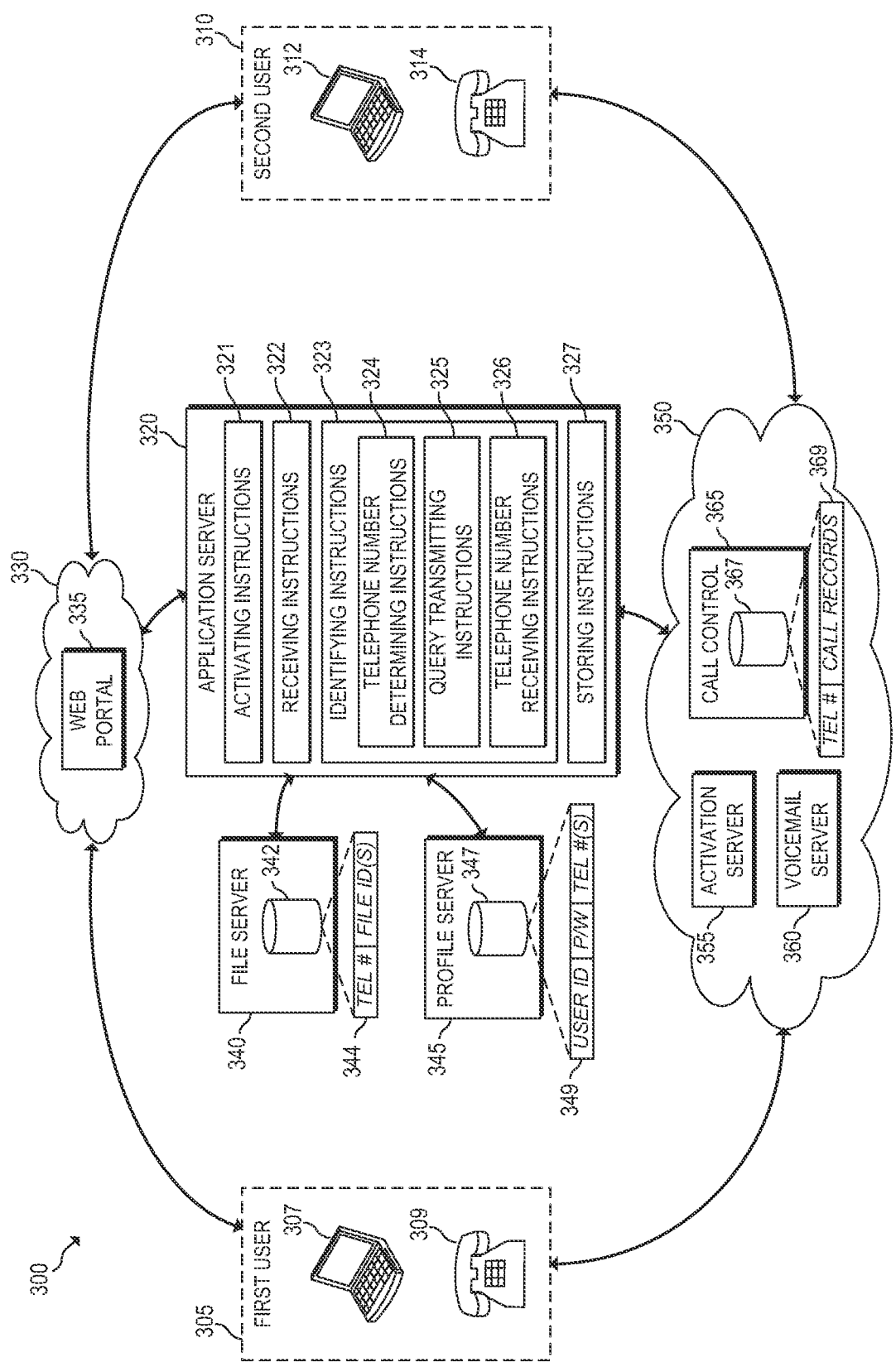
FIG. 3 is a block diagram of an example system for managing transmission of files based on records of telephone calls between a first user and a second user.

FIG. 3 is a block diagram of an example system 300 for managing transmission of files based on records of telephone calls between a first user 305 and a second user 310. As illustrated, system 300 may include users 305, 310, application server 320, web portal 335, file server 340, profile server 345, activation server 355, voicemail server 360, and call control server 365.

First user 305 may have access to a first web terminal 307 and a first telephone 309, while second user 310 may have access to a second web terminal 312 and a second telephone 314. Web terminals 307, 312 may each be, for example, a desktop or all-in-one computer, a laptop computer, a mobile phone, a portable reading device, or a slate computer. Telephones 309, 314 may each be associated with a particular telephone number and may each be, for example, a wireless telephone, a land-line telephone, or a Voice Over Internet Protocol (VoIP) telephone.

It should be noted that, although illustrated as separate devices, in some embodiments, the functionality of the web terminals 307, 312 and telephones 309, 314 may be combined into a single device. For example, such an arrangement is possible when the web terminal and telephone are combined into a mobile phone. Similarly, the functionality of the two devices may be combined into a single computing device if the web terminal is a desktop, laptop, or slate computer and the telephone is a VoIP-enabled phone operated using the computer. Other combinations of the functionality of the web terminal and telephone will be apparent to those of skill in the art.

Application server 320 may manage the process for transferring files between first user 305 and second user 310. Application server 320 may include a processor (not shown) for fetching, decoding, and executing instructions 321-327, which may be encoded on a machine-readable storage medium. As an alternative or in addition to fetching, decoding, and executing instructions, the processor may include one or more integrated circuits (ICs) or other electronic circuits that comprise a plurality of electronic components for performing the functionality of one or more of instructions 321-327.

Activating instructions 321 may manage the activation process used to enable the transfers and the retrieval for a particular user 305, 310. As an example of a particular activation process, activating instructions 321 may first receive a request from a user's web terminal 307 via web portal 335 to activate a specified telephone number. In response, activating instructions 321 may generate an activation code and temporarily store the code in association with the specified telephone number. The activation code may be, for example, a random string of alphanumeric characters. Application server 320 may then transmit, to the first web terminal 307 via web portal 335, the generated code along with a telephone number of an activation server 355 in a telecommunication network 350.

In response, first user 305 may use his or her telephone 309 to dial the provided number of activation server 355 and, in response to a prompt from activation server 355, provide the generated code previously received from application server 320. To provide the generated code, first user 305 may, for example, use a keypad of the telephone or verbally provide the code when activation server 355 supports Interactive Voice Response (IVR). After receipt of the entered code, activation server 355 may forward the code entered by the user and the telephone number of telephone 309 to application server 320.

Upon receipt of the entered code and the telephone number, activating instructions 321 may retrieve the generated code stored for the telephone number and compare the retrieved code to the code entered by first user 305. When these codes match, activating instructions 321 may determine that the user 305 has confirmed his or her possession of the specified telephone number. Accordingly, activating instructions 321 may transfer a request to profile server 345 for creation of a record associating the confirmed telephone number with the user identifier of first user 305. User 305 may subsequently submit additional requests to web portal 335 to repeat this process with any additional telephone numbers, thereby confirming his or her possession of each telephone number.

It should be noted that, in embodiments in which the web terminal 307 and telephone 309 are combined into a single device, activating instructions 321 may automatically confirm the relationship between the user and a particular telephone number. For example, in some embodiments, the combined terminal/telephone may include a unique device identifier (ID) that is stored in association with the telephone number of the device in a location accessible by application server 320. In such embodiments, activating instructions 321 may confirm the user's possession of a specified telephone number by determining the device ID of the terminal 307, determining the telephone number using the device ID, and comparing the actual number with the number specified by the user.

Receiving instructions 322 may receive and process various requests from users 305, 310. For example, receiving instructions 322 may receive an activation request from a web terminal 307, 312 and, in response, trigger activating instructions 321. As another example, receiving instructions 322 may receive a request to transfer a file from first user 305 to a second user 310 based on a current or previous telephone call between the users' telephones 309, 314. In response, receiving instructions 322 may initiate identifying instructions 323, described in detail below. In addition, receiving instructions 322 may receive requests from users 305, 310 to access files stored in association with one or more of their telephone numbers. In response, receiving instructions 322 may trigger a file retrieval process, such as the process described in detail below in connection with FIG. 7.

Identifying instructions 323 may be executed to identify the telephone numbers of each user 305, 310 upon receipt of a request to transfer a file from one user to the other. For example, upon receipt of a request from a web terminal 307 of first user 305 to transfer a file to a location associated with a telephone number of second user 310, identifying instructions may first trigger telephone number determining instructions 324 to determine the telephone number of first user 305. Determining instructions 324 may, for example, determine the user name of first user 305 and transmit the user name to profile server 345 with a request to retrieve all telephone numbers associated with that user name. When first user 305 has activated multiple telephone numbers, determining instructions 324 may, in some embodiments, request that the user specify the particular telephone number to be used for the transfer.

After identification of the telephone number of telephone 309 of first user 305, query transmitting instructions 325 may transmit a query to a call control server 365 in a telecommunication network 350. For example, query transmitting instructions 325 may transmit the telephone number of first user 305 to call control server 365 with a request to access call records 369 associated with that telephone number. The query may also specify, for example, whether to retrieve only a most recent record (e.g., of a current call or a most-recently established call) or, alternatively, a predetermined number of the most recent calls.

In response to transmission of the query to call control server 365, telephone number receiving instructions 326 may receive a record of one or more calls with which the identified telephone number of first user 305 has established a call. When the record includes a single telephone number, receiving instructions 326 may trigger storing instructions 327 with a parameter specifying the telephone number, described below. Alternatively, when the record includes multiple telephone numbers, receiving instructions 326 may request selection of a destination telephone number by first user 305 via web portal 335. Receiving instructions 326 may then trigger storing instructions 327 with the telephone number selected by first user 305.

Storing instructions 327 may store the file received from web terminal 307 in a storage location identified using the telephone number of the second user 310. For example, storing instructions 327 may transmit the file to file server 340 for storage in storage area 342 in association with the identified telephone number. As another example, storing instructions 327 may use the identified telephone number to determine a user identifier of the second user 310 and store the file in a location indexed by user identifier. It should be noted that, in some embodiments, storing instructions 327 may instead store the file in a storage area local to application server 320. After storage of the file, second user 310 may subsequently retrieve the file using, for example, the procedure described in detail below in connection with FIG. 7.

Packet-switched network 330 may be any combination of routers, switches, and other network devices that exchanges data using a set of packet-based protocols, such as the Transmission Control Protocol/Internet Protocol (TCP/IP) suite. Network 330 may include web portal 335, which may be any computing device that exchanges data with web terminals 307, 312. For example, web portal 335 may be a web server that transmits one or more web pages or web-based applications for managing a login or authentication procedure and for receiving and forwarding file transfer and retrieval requests. Thus, in operation, web portal 335 may serve as a gateway between terminals 307, 312 and application server 320 to enable users 305, 310 to store and retrieve files.

File server 340 may be any computing device suitable for storage of data in a storage area 342 according to a schema 344. Storage area 342 may comprise a number of physical media for storing data, such as one or more hard disks, solid state drives, tape drives, nanodrives, holographic storage devices, or any combination of such storage devices. In some embodiments, storage area 342 may include a plurality of storage devices that, in combination, form a pool of available storage. As illustrated, storage area 342 may be indexed according to schema 344, such that each telephone number is associated with a number of file identifiers corresponding to files stored for that telephone number. These file identifiers may be, for example, file paths, pointers to an actual physical storage location, or any other data representation that uniquely identifies a storage location of a given file.

In operation, file server 340 may receive file storage requests from application server 320, which may include a destination telephone number and a particular file. In response, file server 340 may store the file in an appropriate location in storage area 342, generate an appropriate file identifier based on that location, and store the file identifier in association with the telephone number according to schema 344. In some embodiments, file server 340 may also store a telephone number and/or user name of the user who originated the file transfer request.

In addition, file server 340 may receive file retrieval requests from application server 320, which may include a telephone number of a user 305, 310 seeking to access his or her files. In response, file server 340 may access storage area 342 to retrieve all file identifiers associated with the received telephone number. File server 340 may then return a listing of file identifiers to application server 320. Subsequently, file server 340 may receive a request to provide one or more files corresponding to particular file identifiers to application server 320. In response, file server 340 may retrieve the identified file(s) from storage area 342 and begin transmission of the files to application server 320.

Profile server 345 may be any computing device suitable for storage of data in a storage area 347 according to a schema 349. Storage area 347 may comprise a number of physical media for storing data, such as one or more hard disks, solid state drives, tape drives, nanodrives, holographic storage devices, or any combination of such storage devices. In some embodiments, storage area 347 may include a plurality of storage devices that, in combination, form a pool of available storage. As illustrated, storage area 347 may be indexed according to schema 349, such that each user name is associated with a password or other authentication parameter and one or more telephone numbers.

In operation, profile server 345 may receive and process requests from application server 320 relating to the users and their telephone numbers. For example, upon proper activation of a telephone number of a particular user, application server 320 may transmit a request to register the telephone number to the particular user. In response, profile server 345 may store the received telephone number in storage area 347 in association with the user identifier of the user. Similarly, when identifying the telephone numbers associated with a particular user identifier, application server 320 may transmit a query including the user identifier of the user. In response, profile server 345 may access storage area 347 using the received user identifier and return any telephone numbers associated with that user identifier.

Telecommunication network 350 may be any combination of network devices that exchanges data associated with calls between telephones, such as telephones 309, 314. Thus, telecommunication network 350 may be, for example, a circuit-switched network. Network 350 may alternatively be a wireless network, such as a Global System for Mobile Communications (GSM) network, a Long Term Evolution (LTE) network, or any other network for transmission of data between wireless telephones. In some embodiments, network 350 may instead be a packet-switched network for transmitting VoIP call data.

Regardless of the particular implementation, network 350 may include activation server 355, which, as described above, may be used in conjunction with application server 320 for managing an activation process for registering a particular telephone number to a user. Activation server 355 may be any computing device suitable for communicating with a telephone 309, 314 of a user to receive an entered activation code. In some embodiments, activation server 355 may implement Interactive Voice Response (IVR) technology to allow the user to provide the activation code verbally.

Network 350 may also include voicemail server 360, which may be any computing device suitable for establishing a voicemail session with a particular telephone 309, 314. For example, when a particular user does not answer his or her phone, does not have wireless service, or otherwise fails to establish a connection with a calling user, voicemail server 360 may answer the call based on receipt of a signal from call control server 365. In response, voicemail server 360 may record and store a message left by the calling user. According to embodiments disclosed herein, a user may transfer a file based on a telephone number of another user during or after establishment of a connection with voicemail server 360.

Finally, network 350 may include call control server 365, which may be any computing device suitable for managing calls between telephones communicating via network 350, such as telephones 309, 314. Call control server 365 may, for example, manage signaling between telephones 309, 314 used to establish and maintain a call. Call control server 365 may include storage area 367, which may comprise a number of physical media for storing data, such as one or more hard disks, solid state drives, tape drives, nanodrives, holographic storage devices, or any combination of such storage devices. In some embodiments, storage area 367 may include a plurality of storage devices that, in combination, form a pool of available storage.

As illustrated, storage area 367 may be indexed according to schema 369, such that call records may be accessed using a particular telephone number as a parameter. In operation, call control server 365 may maintain call records based on the establishment of calls between two telephone numbers. Each call record may provide details about a particular call, such as the two numbers involved in the call, a starting time of the call, whether the call is in progress, and/or a duration of the call. As detailed above, call control server 365 may receive queries from application server 320 requesting N call records relating to a particular telephone number. In response, call control server 365 may access the call records maintained in storage area 367 for the particular number and return N of the records, which may be, for example, the N most recent calls. In returning the records, call control server 365 may return the full record or a subset of information contained therein, such as the telephone number with which each call was established.

It should be noted that, in some embodiments, the above-described functionality of two or more of the servers 320, 335, 340, 345, 355, 360, 365 may be combined into a single server. For example, in some embodiments, file server 340 and profile server 345 may be combined into a single server with a shared storage area. In addition, the functionality of one or more of the servers 320, 335, 340, 345, 355, 360, 365 may be split into multiple servers. Other suitable arrangements for distributing the functionality of these servers will be apparent to those of skill in the art.

Figure 4:
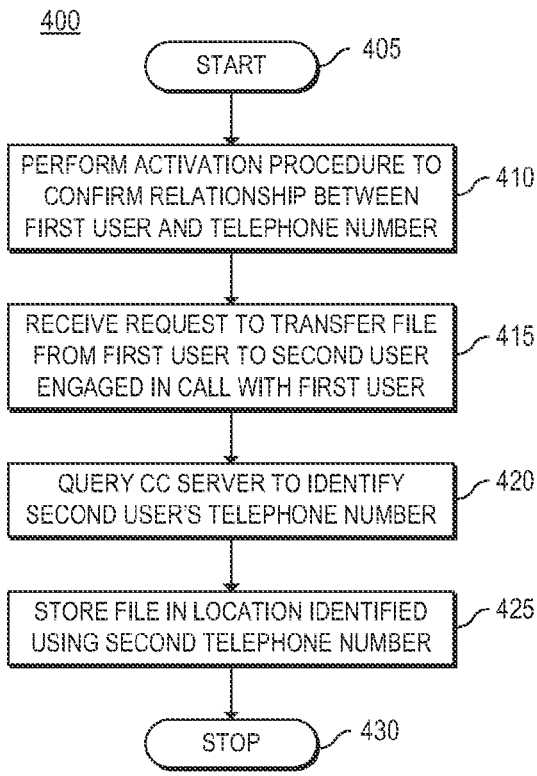
FIG. 4 is a flowchart of an example method for transferring a file from a first user associated with a first telephone number to a second user associated with a second telephone number.

FIG. 4 is a flowchart of an example method 400 for transferring a file from a first user 305 associated with a first telephone number to a second user 310 associated with a second telephone number. Although execution of method 400 is described below with reference to application server 320, other suitable components for execution of method 400 will be apparent to those of skill in the art (e.g., server computing device 100). Method 400 may be implemented in the form of executable instructions stored on a machine-readable storage medium, such as a storage medium included in application server 320, or in the form of electronic circuitry.

Method 400 may start in block 405 and proceed to block 410, where application server 320 may perform an activation procedure to confirm a relationship between a first user 305 and a first telephone number. For example, application server 320 may generate a random code, transmit this code to first user 305, and request that first user 305 call an activation server 355 from the first telephone number and provide the random code. Further details for performing an activation procedure in this manner are described in detail below in connection with FIG. 5. As another example, application server 320 may confirm the relationship between the first user 305 by communicating the code to the first telephone number via text message or automated call and requesting that the user provide the received code via web portal 335. Other suitable activation procedures for confirming the relationship between the first user 305 and the first telephone number will be apparent to those of skill in the art.

After activation, method 400 may proceed to block 415, where application server 320 may receive a request to transfer a file from the first user 305 to a second user 310 currently or previously engaged in a call with the first user 305. For example, after login to web portal 335, first user 305 may trigger the file transfer process based on transmission of a command to web portal 335 from his or her web terminal 307. Web portal 335 may, in turn, forward information regarding the file transfer to application server 320. This information may include, for example, the user name of first user 305 and the file to be transferred.

Method 400 may then proceed to block 420, where application server 320 may query call control server 365 to identify a telephone number associated with the second user 310 based on a current or previous call established with first user 305. In transmitting the query to call control server 365, application server 320 may provide the telephone number of first user 305 which may be determined, for example, by querying profile server 345 with the user name of first user 305.

After application server 320 receives the second user's telephone number from call control server 365, method 400 may proceed to block 425, where application server 320 may initiate storage of the file received from the web terminal 307 of the first user 305. For example, application server 320 may transfer the file to file server 340 along with the telephone number received from call control server 365. In response, file server 340 may store the file in a location in storage area 342, generate a file identifier corresponding to this location, and index the file based on the telephone number of the second user 310. As an alternative, file server 340 may index the file using a user identifier of the second user 310 determined by application server 320 using the telephone number of the second user 310. It should be noted that, in some embodiments, application server 320 may instead store the file locally. After storage of the file by application server 320, method 400 may proceed to block 430, where method 400 may stop.

Figure 5:
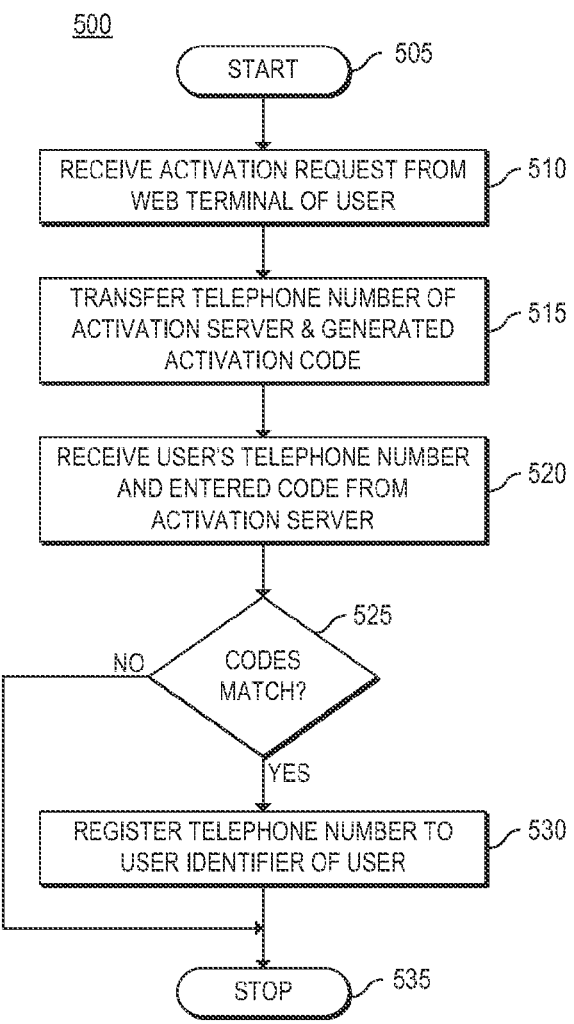
FIG. 5 is a flowchart of an example activation method for confirming a relationship between a user and a particular telephone number.

FIG. 5 is a flowchart of an example activation method 500 for confirming a relationship between a user 305 and a particular telephone number. Although execution of method 500 is described below with reference to application server 320, other suitable components for execution of method 500 will be apparent to those of skill in the art (e.g., server computing device 100). Method 500 may be implemented in the form of executable instructions stored on a machine-readable storage medium, such as a storage medium included in application server 320, or in the form of electronic circuitry.

Method 500 may start in block 505 and proceed to block 510, where application server 320 may receive an activation request from a web terminal 307 of a user 305. For example, after establishing a session with web portal 335 based on provision of a user identifier and password, user 305 may submit a request to register a telephone number to his or her account.

Method 500 may then proceed to block 515, where application server 320 may generate an activation code and transfer this code along with the telephone number of an activation server 355 to web terminal 307 via web portal 335. In transmitting this information, application server 320 may instruct the user to call activation server 355 at the displayed number and to provide the activation code to activation server 355.

After the user 305 contacts activation server 355 with an entered code, method 500 may proceed to block 520, where application server 320 may receive the user's telephone number and the entered code from activation server 355. In block 525, application server 320 may determine whether the code provided by user 305 to activation server 355 matches the code generated in block 515. When the codes match, method 500 may proceed to block 530, where application server 320 may register the telephone number to user 305. For example, application server 320 may initiate storage of the telephone number in storage 347 of profile server 345 in association with the user's identifier. Method 500 may then proceed to block 535, where method 500 may stop. Alternatively, when the codes do not match in block 525, method 500 may proceed directly to block 535.

Figure 6:
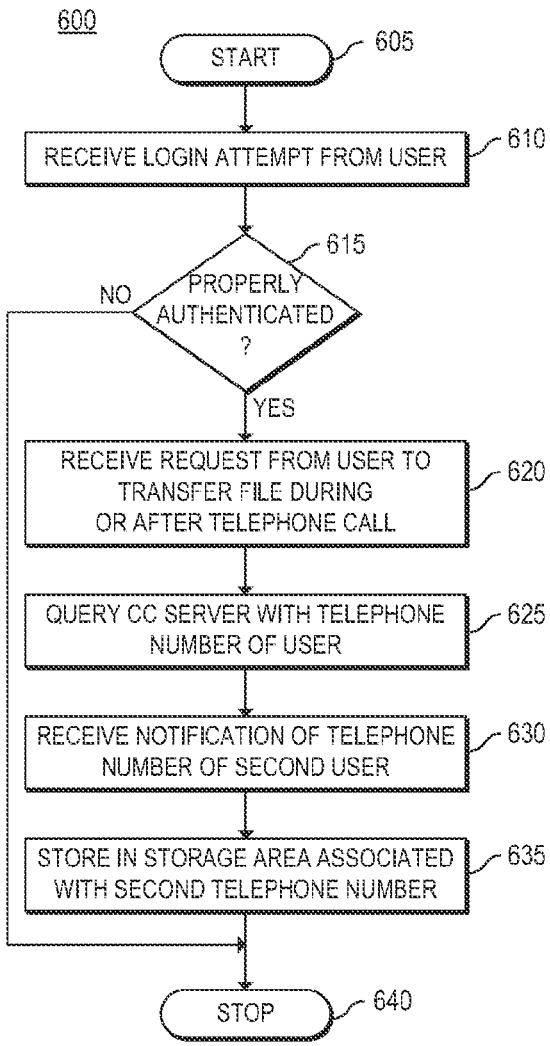
FIG. 6 is a flowchart of an example method for processing a request from a first user to transfer a file to a second user associated with a second telephone number.

After activation of a particular phone number, a user may initiate transfers of files based on calls including that telephone number based, for example, on execution of method 600 of FIG. 6 by application server 320. The user may also initiate retrieval of files based, for example, on execution of method 700 of FIG. 7 by application server 320.

It should be noted that the activation procedure, such as example method 500 described above, may be repeated multiple times for each user. In this manner, a given user may register multiple telephone numbers to his or her user account, thereby allowing the user to initiate file transfers based on calls from multiple telephone numbers. In addition, registration of multiple telephone numbers may allow the user to retrieve files transferred to any of his or her registered telephone numbers.

FIG. 6 is a flowchart of an example method 600 for processing a request from a first user 305 to transfer a file to a second user 310 associated with a second telephone number. Although execution of method 600 is described below with reference to application server 320, other suitable components for execution of method 600 will be apparent to those of skill in the art (e.g., server computing device 100). Method 600 may be implemented in the form of executable instructions stored on a machine-readable storage medium, such as a storage medium included in application server 320, or in the form of electronic circuitry.

Method 600 may start in block 605 and proceed to block 610, where application server 320 may receive a login attempt from first user 305. For example, first user 305 may use his or her web terminal 307 to access web portal 335 and, in response to a prompt from web portal 335, provide a user identifier and password.

Method 600 may then proceed to block 615, where application server 320 may determine whether the user is properly authenticated based on the data provided with the login attempt. For example, upon receipt of the entered data from web portal 335, application server 320 may contact profile server 345 to retrieve the password maintained in storage 347 in association with the user's identifier. When the user 305 has entered an incorrect password for the entered user name, method 600 may proceed to block 640, where method 600 may stop. Alternatively, when the retrieved password and the password entered by the user 305 match, application server 320 may determine that the user 305 is properly authenticated. Accordingly, method 600 may proceed to block 620.

In block 620, application server 320 may receive a request from the first user 305 to transfer a file to a second user 310 during or after a telephone call established between first user's telephone 309 and second user's telephone 314. Upon receipt of a file transfer request, method 600 may proceed to block 625, where application server 320 may query call control server 365 to determine, for example, the last telephone number in communication with the number of telephone 309. In transmitting this query, application server 320 may include the number of telephone 309, which may be determined, for example, based on a query of profile server 345.

Method 600 may then proceed to block 630, where application server 320 may receive a response from call control server 365 with the most recent telephone number in communication with telephone 309, which, in this case, will be the number of telephone 314 of the second user 310. Accordingly, method 600 may proceed to block 635, where application server 320 may store the file provided by the web terminal 307 of first user 305 in file server 340. File server 340 may, for example, store the file in storage area 342 in association with the number of telephone 314 of second user 310 and, in some embodiments, the telephone number and/or user identifier of first user 305. Method 600 may then proceed to block 640, where method 600 may stop.

Figure 7:
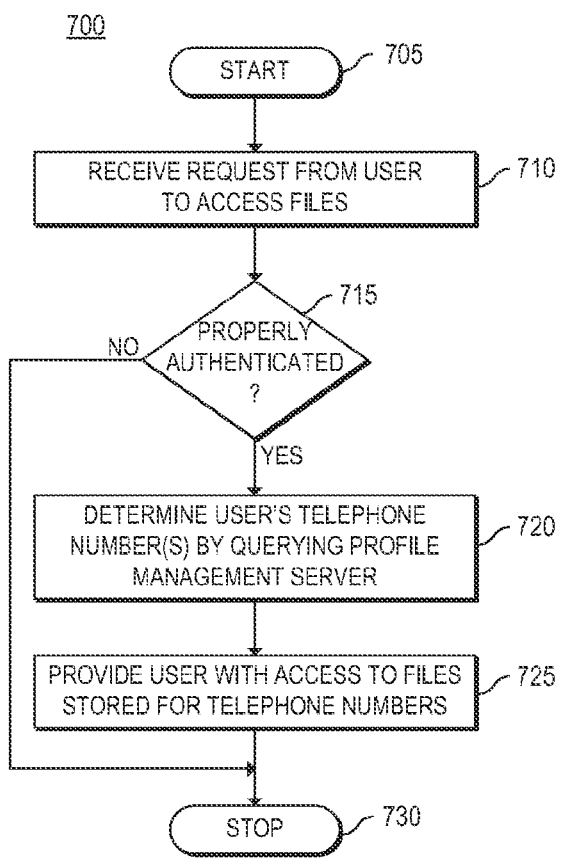
FIG. 7 is a flowchart of an example method for providing a user with access to files stored in association with telephone numbers of the user.

FIG. 7 is a flowchart of an example method 700 for providing a user 310 with access to files stored in association with telephone numbers of the user 310. Although execution of method 700 is described below with reference to application server 320, other suitable components for execution of method 700 (e.g., server computing device 100) will be apparent to those of skill in the art. Method 700 may be implemented in the form of executable instructions stored on a machine-readable storage medium, such as a storage medium included in application server 320, or in the form of electronic circuitry.

Method 700 may start in block 705 and proceed to block 710, where application server 320 may receive a request to access files from a user, such as second user 310. For example, second user 310 may use web terminal 312 (or any other web-connected device) to access web portal 335 and, in response to a prompt from web portal 335, provide a user identifier and password.

Method 700 may then proceed to block 715, where application server 320 may determine whether the user 310 is properly authenticated. For example, upon receipt of the entered data from web portal 335, application server 320 may contact profile server 345 to retrieve the password maintained in storage 347 in association with the user's identifier. When the user 310 has entered an incorrect password for the provided user identifier, application server 320 may deny access to the files. Accordingly, method 700 may proceed to block 730, where method 700 may stop. Alternatively, when the retrieved password and the password entered by the user 310 match, application server 320 may determine that the user 310 is properly authenticated. Accordingly, method 700 may proceed to block 720.

In block 720, application server 320 may determine any telephone numbers associated with the user's account. For example, application server 320 may query profile server 345 to determine any telephone numbers associated with the user name of user 310. In response, profile server 345 may provide a listing of any such telephone numbers.

Upon receipt of these numbers in application server 320, method 700 may proceed to block 725, where application server 320 may provide user 310 with access to any files stored in association with the received telephone numbers. For example, application server 320 may contact file server 340 with each of the telephone numbers to retrieve a listing of files in storage 342. Application server 320 may then communicate this file listing to user 310 including, for example, a telephone number and/or user identifier from which the file was received. Application server 320 may subsequently retrieve any files requested by user 310 from file server 340. Method 700 may then proceed to block 730, where method 700 may stop.

According to the foregoing, example embodiments disclosed herein allow for transfer of files from a first user to a location identified using a telephone number of a recipient with whom the first user has been in communication via telephone. In this manner, a user may transfer files to a recipient based on telephone calls with the recipient. Example embodiments thereby provide a user-friendly file transfer mechanism, while providing additional security by reducing the possibility of malicious file transfers.

I claim:

1. A computing device comprising:
a processor to:
activate a user account of a first user to confirm a relationship between the first user and an associated with first telephone number,
receive a request to transfer a file from the first user associated with a first telephone number to a second user associated with a second telephone number during a telephone connection between the first telephone number and a voicemail service for the second telephone number, the request received from a web terminal of the first user and identifying a user name of the first user and a filename of the file,
after receiving the request, determining the first telephone number of the first user from the user name of the first user;
after determining the first telephone number, identify the second telephone number associated with the second user using a record of telephone calls including the first telephone number,
after identifying the second telephone number, determine whether a prior telephone call between the first telephone number and the second telephone number was established,
in response to determining that the prior telephone call was established, store the file in a storage location accessible by the second user, wherein the storage location is identified using the second telephone number and not the first telephone number, and permit the first user to leave a voicemail for the second user, and
in response to determining that the prior telephone call was not established, deny storage of the file in the storage location, and still permit the first user to leave the voicemail for the second user.

2. The computing device of claim 1, wherein, to identify the second telephone number, the processor:
determines the first telephone number based on a user identifier associated with the first user,
executes a query to determine a telephone number with which the first telephone number has most recently established a call, and
receives the telephone number with which the first telephone number has most recently established a call.

3. The computing device of claim 1, wherein, to identify the second telephone number, the processor):
determines the first telephone number based on a user identifier associated with the first user,
obtains, from the record of telephone calls, a list of recent calls including the first telephone number, and
receives a user selection of the second telephone number from the list of recent calls.

4. The computing device of claim 1, wherein the processor receives the request to transfer the file:
subsequent to completion of a telephone call between the first telephone number and the second telephone number.

5. The computing device of claim 1, wherein, to store the file, the processor performs one of:
storing the file in the storage location using the second telephone number as an index, and
storing the file in the storage location using a user identifier of the second user as an index, wherein the user identifier of the second user is determined using the second telephone number.

6. The computing device of claim 1, wherein:
prior to accepting receipt of the request to transfer the file from the first user, the processor performs an activation procedure to confirm a relationship between the first user and the first telephone number.

7. The computing device of claim 1, wherein:
a web terminal of the first user also functions as a telephone that utilizes the first telephone number, and
the processor activates the web terminal using a device identifier of the web terminal to confirm a relationship between the web terminal and the first telephone number.

8. A non-transitory machine-readable storage medium encoded with instructions executable by a processor of a computing device, the non-transitory machine-readable storage medium comprising:

instructions for activating a user account of a first user to confirm a relationship between the first user and an associated first telephone number;

instructions for receiving a request to transfer a file from the first user during a telephone connection between the first telephone number and a second telephone number associated with a second user, the telephone connection being a connection between the first telephone number and the voicemail service for the second telephone number, the request received from a web terminal of the first user and identifying a user name of the first user and a filename of the file;

instructions for, after receiving the request, determining the first telephone number of the first user from the user name of the first user;

instructions for, after determining the first telephone number of the first user, determining the second telephone number of the second user from call records of the first telephone number;

instructions for, after determining the second telephone number of the second user, determining whether a prior telephone call between the first telephone number and the second telephone number was established;

instructions for, in response to determining that the prior telephone call was established, transferring the file from the first user to a storage location identified using the second telephone number of the second user and not the first telephone number of the first user; and instructions for, in response to determining that the prior telephone call was not established, denying transfer of the file from the first user to the storage location, and still permitting the first user to leave the voicemail for the second user.

9. The non-transitory machine-readable storage medium of claim 8, wherein the instructions for receiving the request from the first user further comprise:

instructions for providing a user identifier and a password of the first user to a server that has access to the storage location.

10. The non-transitory machine-readable storage medium of claim 8, wherein the telephone connection is:

a connection between the first telephone number and a voicemail service for the second telephone number.

11. A method comprising:

performing, in a server computing device, an activation procedure to confirm a relationship between a first user and an associated first telephone number;

receiving a request to transfer a file from the first user to a second user previously engaged in a call with the first user during a telephone connection between the first telephone number and a voicemail service for a second telephone number, the request received from a web terminal of the first user and identifying a user name of the first user and a filename of the file;

after receiving the request, determining the first telephone number of the first user from the user name of the first user;

after determining the first telephone number of the first user, querying call records in a call control server to identify the second telephone number associated with the second user with which the first user is or was engaged in the call;

after querying the call records to identify the second telephone number, determining whether a prior telephone call between the first telephone number and the second telephone number was established;

in response to determining that the prior telephone call was established, storing a file received from a web terminal of the first user in a location identified using the second telephone number, and permit the first user to leave a voicemail for the second user; and in response to determining that the prior telephone call was not establishing, denying storage of the file in the location, and still permit the first user to leave the voicemail for the second user.

12. The method of claim 11, wherein the activation procedure comprises:

transmitting a telephone number of an activation server and a generated activation code to the web terminal of the first user;

receiving, from the activation server, the first telephone number of the first user and an activation code provided by the first user to the activation server; and storing the first telephone number in association with a user identifier of the first user when the provided activation code matches the generated activation code.

13. The method of claim 12, wherein the activation server is an Interactive Voice Response (IVR) server and a communication of the provided activation code is a verbal communication.

14. The method of claim 11, further comprising:

performing the activation procedure to confirm a relationship between the second user and the second telephone number; and providing the stored file to the second user in response to a request received from the second user.

15. The method of claim 11, further comprising:

performing the activation procedure to confirm the relationship between the first user and a third telephone number; and providing the first user with access to files transferred to both the first telephone number and the third telephone number upon request by the first user.

* * * * *

UNITED STATES PATENT AND TRADEMARK OFFICE
CERTIFICATE OF CORRECTION

PATENT NO. : 9,172,819 B2
APPLICATION NO. : 13/810348
DATED : October 27, 2015
INVENTOR(S) : Shigeru Morifuku It is certified that error appears in the above-identified patent and that said Letters Patent is hereby corrected as shown below:

In the Claims:

In column 14, line 36, in Claim 3, delete "processor):" and insert -- processor: --, therefor.

Signed and Sealed this
Ninth Day of August, 2016

Michelle K. Lee
*Director of the United States Patent and Trademark Office*